US007538294B2

(12) United States Patent  
Scotchmer

(10) Patent No.: US 7,538,294 B2  
(45) Date of Patent: May 26, 2009

(54) WELDING ELECTRODE AND METHOD

(75) Inventor: Nigel Scotchmer, Toronto (CA)

(73) Assignee: Huys Industries Limited, Toronto (CA)

( * ) Notice: Subject to any disclaimer, the term of this patent is extended or adjusted under 35 U.S.C. 154(b) by 0 days.

(21) Appl. No.: 11/130,400

(22) Filed: May 17, 2005

(65) Prior Publication Data

US 2006/0261046 A1 Nov. 23, 2006

(51) Int. Cl.
*B23K 11/30* (2006.01)
*B23K 35/22* (2006.01)
(52) U.S. Cl. .......................... 219/119; 219/120
(58) Field of Classification Search ................. 219/119, 219/121.52, 121.49, 121.48, 84, 120, 146.1, 219/146.21, 146.22, 145.1, 145.21
See application file for complete search history.

(56) References Cited

U.S. PATENT DOCUMENTS

| | | | |
|---|---|---|---|
| 3,363,086 A | 1/1968 | Ecklund et al. | |
| 4,029,931 A | 6/1977 | Simmons | |
| 4,044,220 A | 8/1977 | Glagola | |
| 4,049,185 A | 9/1977 | Nippert | |
| 4,071,796 A | 1/1978 | Nippert | |
| 4,071,947 A | 2/1978 | Nippert | |
| 4,149,310 A | 4/1979 | Nippert | |
| 4,288,024 A | 9/1981 | Nippert | |
| 4,345,136 A | 8/1982 | Nippert | |
| D269,617 S | 7/1983 | Nippert | |
| 4,416,141 A | 11/1983 | Nippert | |
| 4,423,617 A | 1/1984 | Nippert | |
| 4,607,514 A | 8/1986 | Nippert | |
| 4,624,303 A | 11/1986 | Nippert | |
| D290,807 S | 7/1987 | Nippert | |
| 4,728,765 A | 3/1988 | Prucher | |
| 4,734,254 A | 3/1988 | Nippert | |
| 4,760,235 A | 7/1988 | Flater | |
| 4,861,961 A * | 8/1989 | Huys | 219/119 |
| 4,889,773 A * | 12/1989 | Campbell et al. | 428/552 |

(Continued)

FOREIGN PATENT DOCUMENTS

CA 902189 6/1972

(Continued)

OTHER PUBLICATIONS

Prabhjit Sidhu, *Wear Mechanism and Technology Improvement of TiC Cap Electrodes For Resistance Spot Welding* (Thesis presented to the University of Waterloo in fulfillment of the thesis requirement for the degree of Master of Applied Science in Mechanical Engineering), 2002, pp 1-147, Waterloo, Ontario, Canada.

(Continued)

*Primary Examiner*—Kevin P Kerns  
(74) *Attorney, Agent, or Firm*—Bereskin & Parr LLP; Kenneth L. Bousfield

(57) ABSTRACT

A welding electrode has a body having a shank and a contact region for placement against a workpiece during welding. A portion of the body may be formed on a parabolic profile. A coating is formed on the contact region. The coating may have a first layer, and a second layer formed over the first layer. The first and second layers may have different compositions. The electrode may have internally formed cooling finwork for interaction with a liquid cooling system.

24 Claims, 6 Drawing Sheets

U.S. PATENT DOCUMENTS

| | | | |
|---|---|---|---|
| 5,066,845 A | 11/1991 | Anderson | |
| 5,155,320 A | 10/1992 | Simmons | |
| 5,471,029 A | 11/1995 | Simmons | |
| 5,756,959 A * | 5/1998 | Freeman et al. | 219/121.49 |
| 5,914,057 A | 6/1999 | Nippert et al. | |
| 5,943,749 A | 8/1999 | Swank | |
| 6,047,471 A | 4/2000 | Nippert et al. | |
| 6,225,591 B1 | 5/2001 | Nippert et al. | |
| 6,355,901 B1 | 3/2002 | Nippert | |
| 6,452,130 B1 * | 9/2002 | Qian et al. | 219/121.52 |
| 6,841,754 B2 * | 1/2005 | Cook et al. | 219/121.48 |
| 7,019,255 B2 * | 3/2006 | Brandt et al. | 219/121.49 |
| 2005/0092728 A1 * | 5/2005 | Barbeau et al. | 219/229 |
| 2006/0029512 A1 | 2/2006 | Dong et al. | |

FOREIGN PATENT DOCUMENTS

| | | |
|---|---|---|
| CA | 1065023 | 10/1979 |
| CA | 1177545 | 11/1984 |
| CA | 2061635 | 3/1997 |
| DE | 198 28 798 A1 | 12/1999 |
| JP | 1-136960 A * | 5/1989 |
| WO | WO 95/11107 A1 | 4/1995 |

OTHER PUBLICATIONS

AZOM.COM, "Graphite (C)—Classifications, Properties and Applications of Graphite" (online: <http://www.azom.com/details.asp?ArticleID=1630>), published on or before Nov. 17, 2002. pp. 1-6.

M Cubed Technologies Inc., "Titanium Carbide Coated Graphite" (online: <http://www.mmmt.com/Technotes/TGNote.pdf>), published on or before Dec. 6, 2003. pp. 1-3.

* cited by examiner

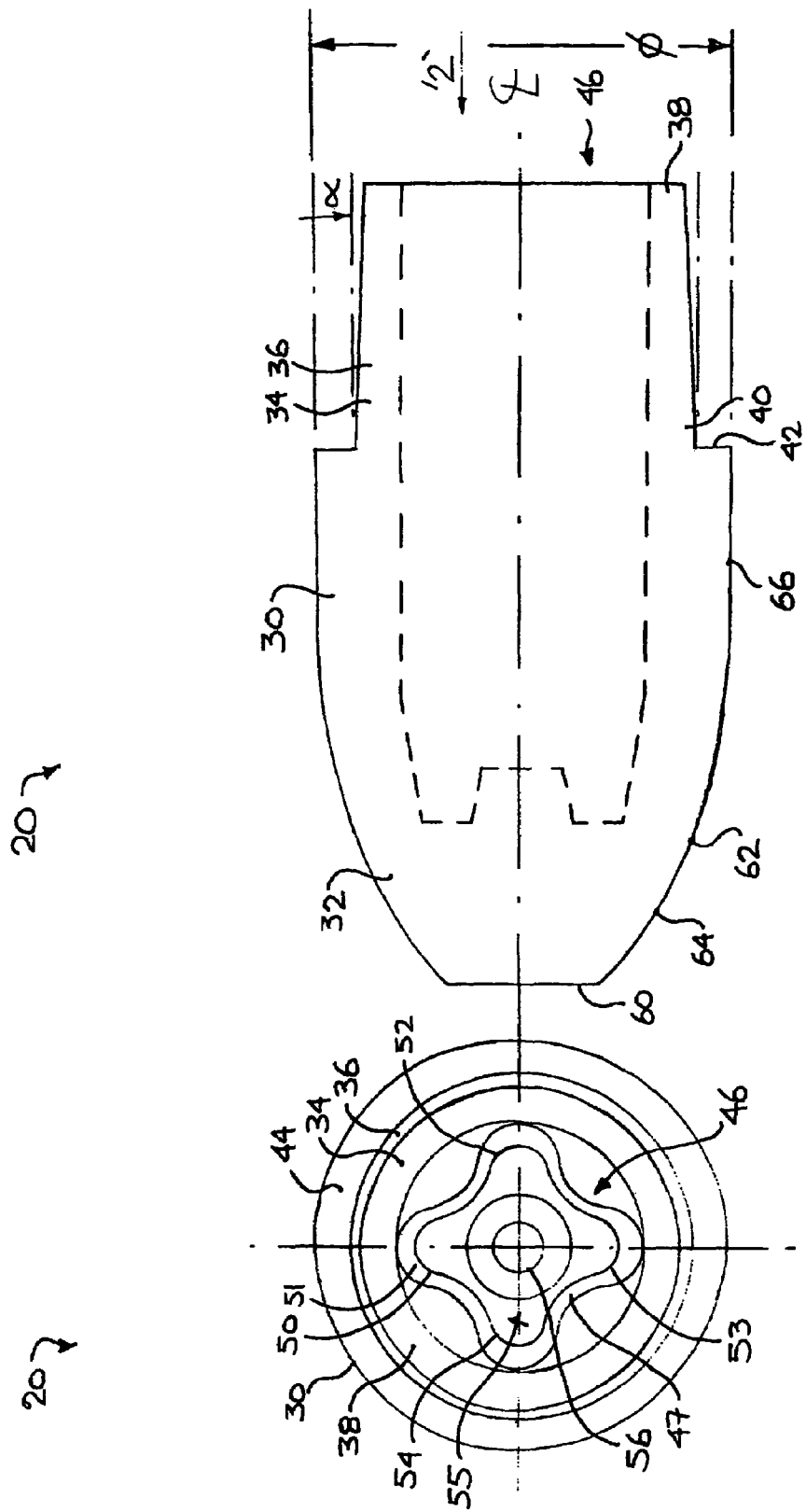

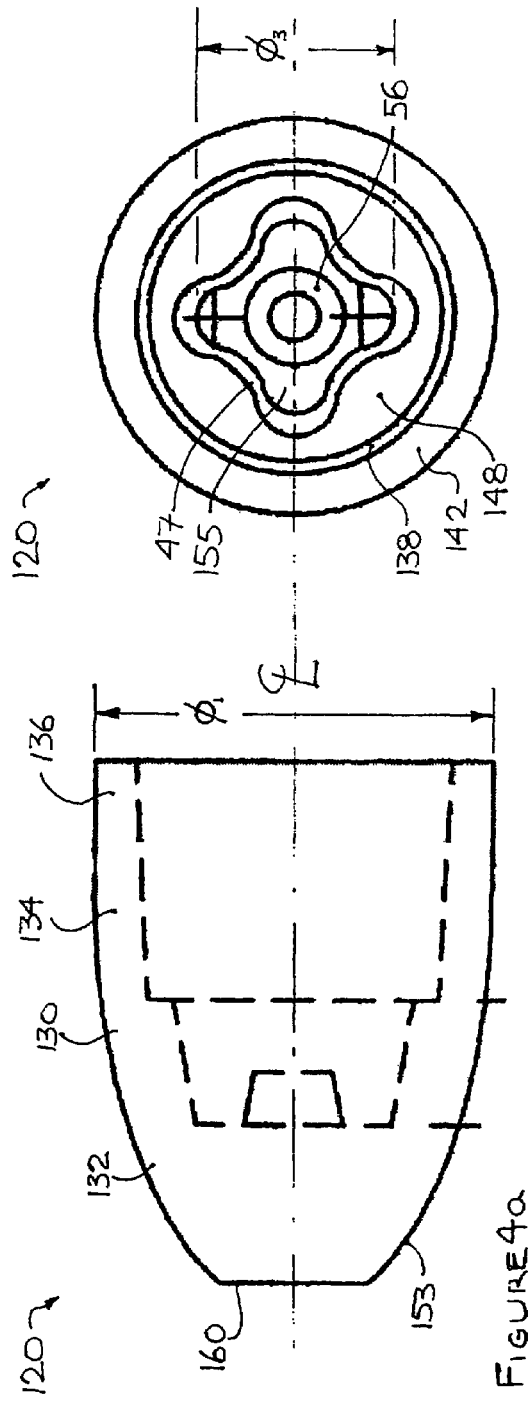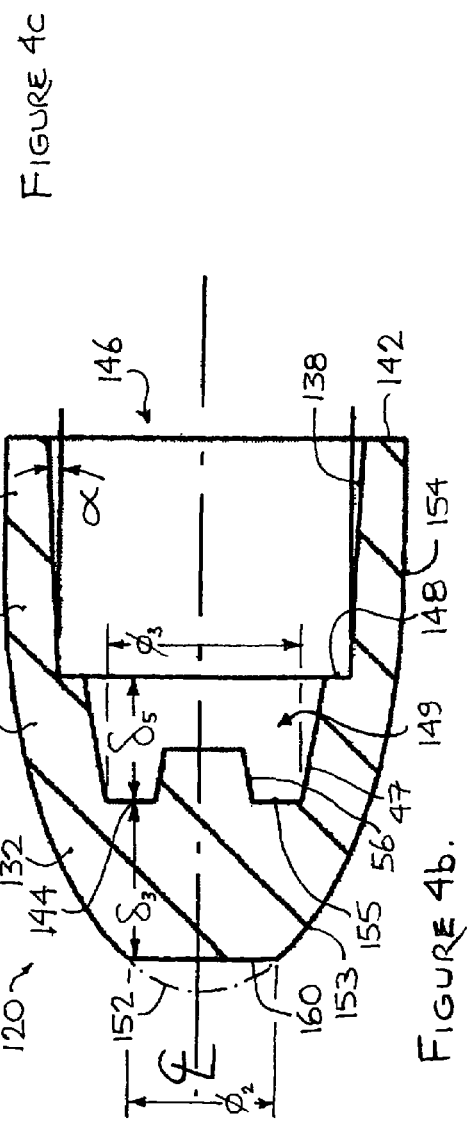

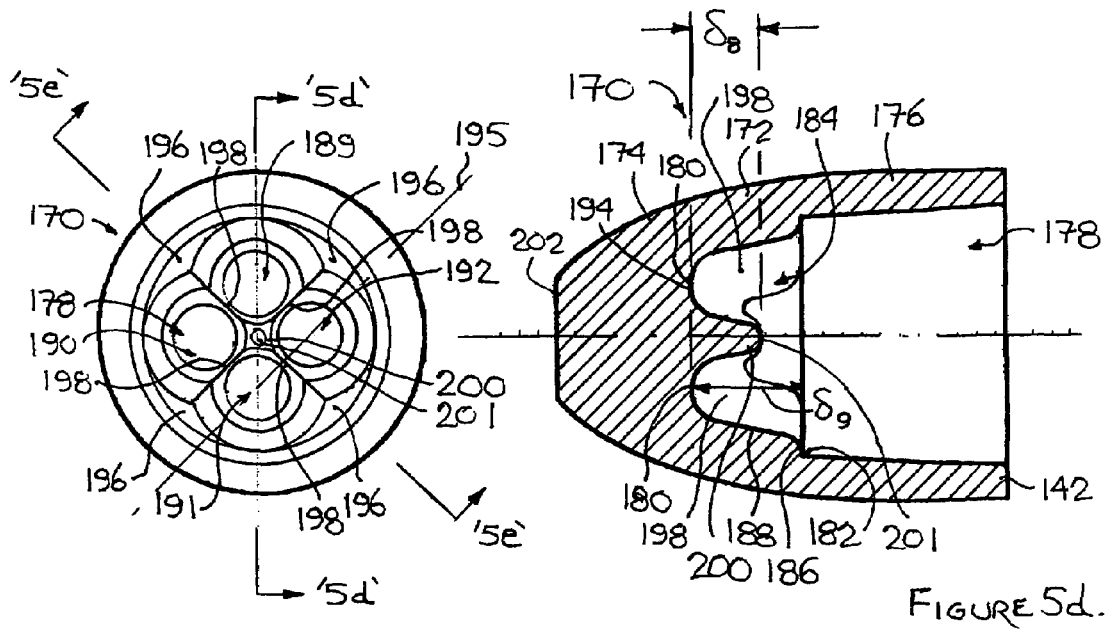
FIGURE 5c.
FIGURE 5d.
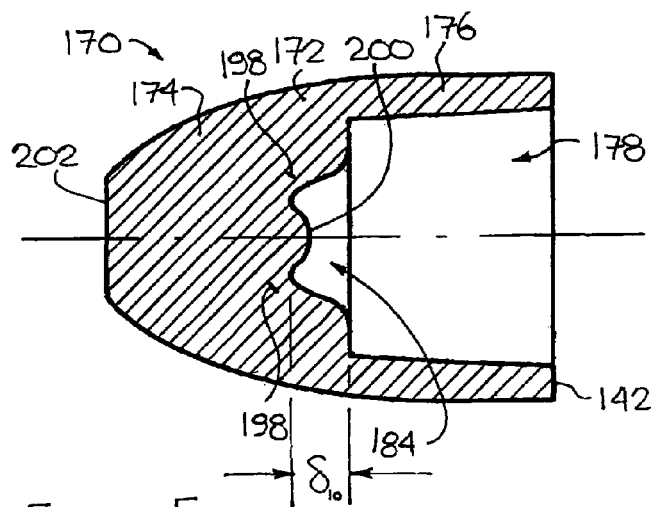
FIGURE 5e.

WELDING ELECTRODE AND METHOD

FIELD OF THE INVENTION

This invention relates to the field of welding electrodes.

BACKGROUND OF THE INVENTION

Welding electrodes may be used in electric resistance welding. Resistance welding techniques are widely used in industry, an example of one such use being the spot welding of car bodies. In that particular application, a welding gun fitted with a pair of co-operating electrodes may be moved in steps along a weld path. At each step, the electrodes are closed onto opposite sides of the workpieces to be welded and an electric current is passed between the electrodes. The electrical resistance presented at the interface between the workpieces may tend to cause local heating to occur, with the result that the workpieces fuse locally to form a weld nugget. The electrodes are then removed from the workpieces. On a production line basis, these steps are performed in rapid sequence and are repeated at each successive weld location.

In high volume manufacturing, particularly where robots may be employed to make the welds, it is advantageous to be able to continue in operation with few interruptions. One cause of interruption may be the need to replace electrodes from time to time. In general, it is desirable to be able to maintain reasonable weld quality without having to change electrodes overly frequently.

The electrodes may most typically be made of copper, or of a copper alloy, having relatively low electrical resistance and high current flow between the electrodes. As may be expected, the electrodes may tend to be come hot during use. The elevated temperature may be associated with a number of phenomena tending to shorten electrode life or to degrade welding performance, or both. First, the electrodes may tend to "pick up", or stick, to the workpiece with the result that sparking and weld separation may occur as the electrodes are removed.

Second, the elevated temperatures may be such as to soften the copper electrodes, making them more prone to deformation under the applied contact pressure during welding. Such deformation may include plastic flow of the tip of the electrode, tending to make the tip flat, or squat, and tending to increase the contact area of the welding tip. This phenomenon may be referred to as "mushrooming". An increase in contact area may tend to lead either to a cooler weld (due to reduced current density), and perhaps an incomplete weld, or to higher welding current, or a combination of the two.

Third, inasmuch as the welding electrodes in question may frequently be used to spot weld galvanized steel sheet in the manufacture of automobiles, at welding temperatures the zinc from the galvanized sheet may tend to migrate into the copper of the welding electrode, this tendency being greatest at the contact region of the electrode. This may tend, undesirably, to cause the formation of brass alloys at the electrode tip, and may tend to shorten tip life.

In general, it may be desirable to keep the electrode tip cool, and to discourage interaction between the material of the electrode tip and the material of the object to be welded or the coatings of the objects to be welded. It may be desirable to form a coating at the electrode tip to discourage migration of zinc, and to discourage plastic deformation. These coatings may be relatively thin—suggested as being of the order of a thousandth, or a few thousandths of an inch for a titanium carbide coating in one reference, and of the order of 5000 Angstroms for a ceramic coating in another reference. Where a coating is formed at the electrode tip, it may be that the life of the electrode may tend to be extended if the coating has relatively few openings or defects through which zinc can migrate, and, in the view of the present inventor, it may be desirable to discourage or delay the formation of cracks or gaps in the coating. Over time, a coating on an electrode tip may tend to degrade under the impact when the welding heads are closed onto the workpiece, in consequence of the heating, and in consequence of the chemical environment. The coating may be worn away, or may become cracked, and the electrode may approach the end of its useful life. In general, the present inventor is of the view that the longer some or all of a coating can remain in place on the electrode tip, and the greater the proportion of the electrode tip that may remain coated, the longer the life of the electrode may be in service.

SUMMARY OF THE INVENTION

In an aspect of the invention there is a welding electrode having a hollow body. The welding electrode is formed of a predominantly copper based material. The welding electrode has a first end for engagement with an electrode holder. The first end is open to the admission and exhaust of cooling fluid to and from said hollow body. The electrode has a second end having a welding tip for engagement with an object to be welded. The hollow body has an array of chambers formed therein. The chambers extend away from the entrance toward the welding tip. The electrode has webs formed therewithin between adjacent pairs of chambers.

In a feature of that aspect of the invention, the electrode has a predominantly titanium coating formed thereon. In another feature, that coating has first and second layers. In another feature, the first and second layers are composed predominantly of titanium carbide, and the second layer has a higher weight percentage of titanium carbide than does the first layer. In another feature, the first layer has a higher weight percentage of titanium carbide than does the second layer. In another feature, the welding electrode has a hollow shank and the shank permits the introduction of a cooling fluid therein. The electrode has cooling finwork therewithin. In another feature, at least a portion of the electrode is formed of a dispersion hardened copper alloy. In a further feature, second layer is composed of a material having poorer adhesion to copper than the first layer.

In a further feature, the first layer is formed by depositing a material that is predominantly Nickel on a predominantly copper welding cap body material. In another feature, the first layer is an underlay layer formed by depositing a material that is at least 5 wt % Molybdenum on a predominantly copper welding cap body. In still another feature, the first layer is an underlay layer formed by depositing a material that is at least 5 wt % Tungsten on a predominantly copper welding cap body. In a further feature, the body is composed predominantly of copper, and the coating includes a layer that is one of (a) an overlay layer; and (b) an underlay layer that includes a mixture of Molybdenum and Tungsten, and wherein that mixture of Molybdenum and Tungsten is part of a coating material applied to said welding cap body, the Molybdenum and Tungsten together form 10 to 15 wt % of the material.

In another aspect of the invention there is a process of manufacturing a welding electrode. That process includes providing a formed blank, the formed blank being made of a material that is predominantly copper, and having a shank for seating in an electrode holder. The formed blank has a head having a contact region for placement against a workpiece to be welded. The process includes forming a main bore in the shank, and forming a plurality of sub-chambers in the head, said sub-chambers being in fluid communication with said main bore.

In another feature, the step of obtaining includes the step of obtaining a blank having internal fins formed therewithin. In a further feature, the step of forming the first layer is preceded by the step of cleaning the contact region. In a further feature, the step of cleaning includes the step of mechanical cleaning. In another feature, the step of mechanical cleaning includes the step of shot peening at least the contact region. In another feature, the step of forming the first layer includes the use of a first deposition process, and the step of forming the second layer involves a second deposition process, and the first deposition process is different from the first deposition process.

In another feature, the process includes the step of forming a central internal cruciform fin. In yet another feature, the process includes the step of forming the blank to have a head located axially forwardly of the shank, and forming the head to a profile, when seen in side view, that is predominantly formed on a curve that is one of (a) parabolic; and (b) elliptic. In a further feature, in which the curve has an apex at an axially foremost location of the head, the process includes the step of trimming back said apex to yield an end flat on the head.

These and other aspects and features of the invention may be understood with reference to the detailed descriptions of the invention and the accompanying illustrations as set forth below.

DESCRIPTION OF THE ILLUSTRATIONS

The accompanying figures are provided by way of illustration of an exemplary embodiment, or embodiments, incorporating principles and aspects of the present invention, and in which:

FIG. 1*a* shows a side view of an example of a male welding electrode;

FIG. 1*b* shows a cross-section of the welding electrode of FIG. 1*a* taken on a longitudinal plane of symmetry thereof;

FIG. 2 shows an end view of the electrode of FIG. 1*a* looking inwardly thereof on arrow '2' of FIG. 1*a*;

Figure 1B:
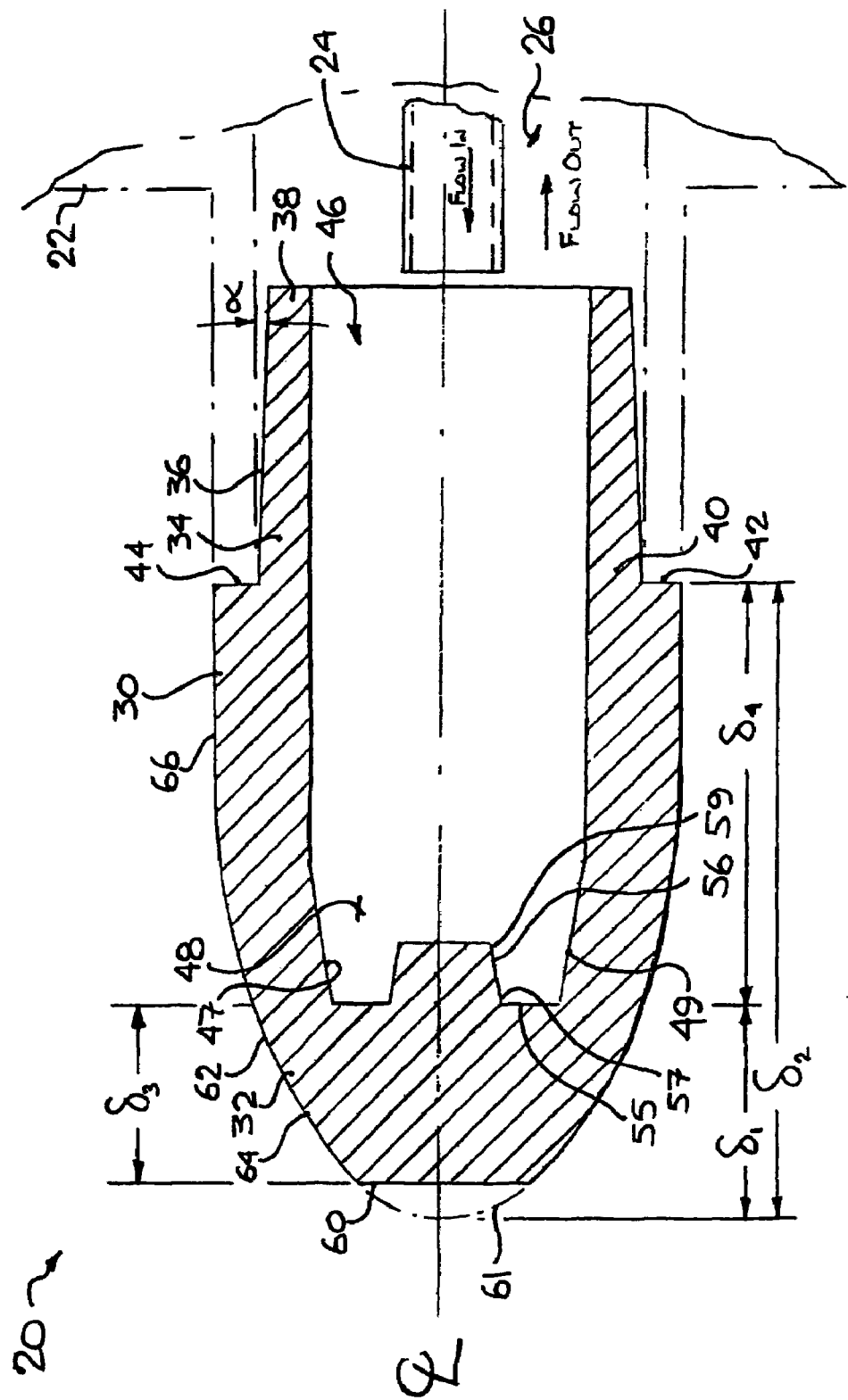
Figure 5B:
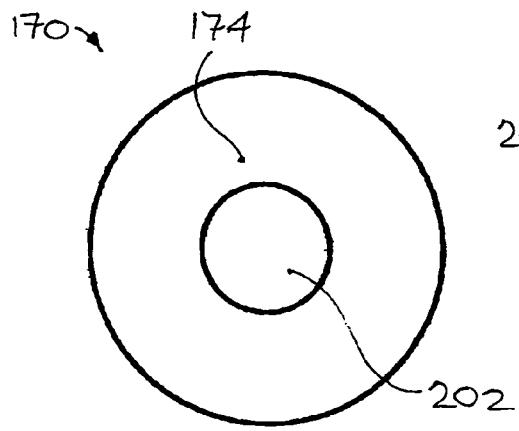
Figure 5A:
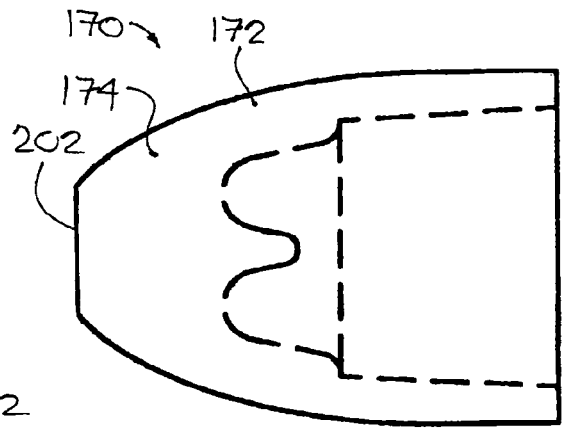
Figure 5G:
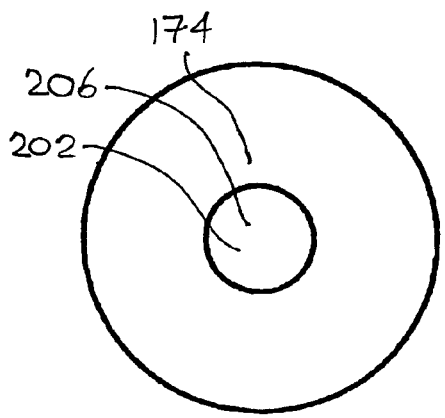
Figure 5F:
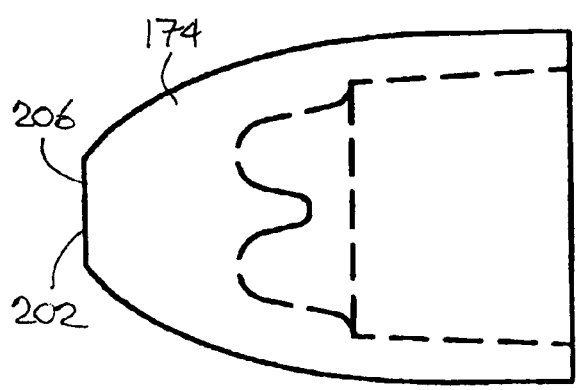
Figure 5I:
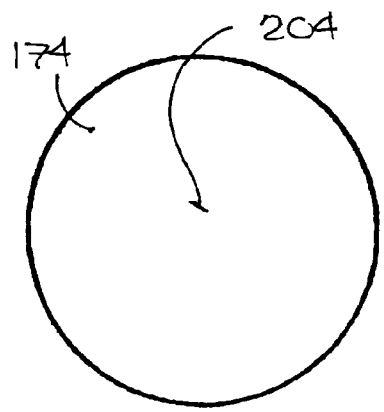
Figure 5H:
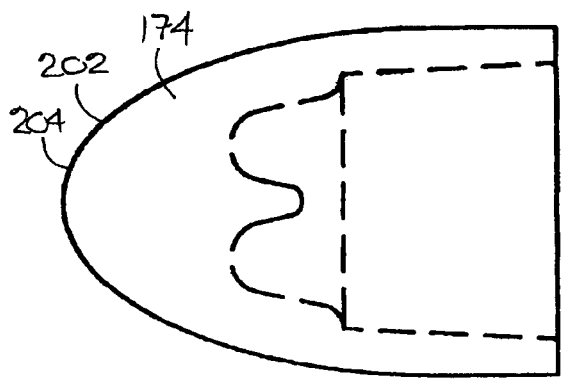

FIG. 4*a* shows a side view of a female electrode analogous to the male electrode of FIGS. 1*a* and 1*b*; and FIG. 4*b* shows a cross-section of the welding electrode of FIG. 4*a* taken on a longitudinal plane of symmetry thereof; and FIG. 4*c* shows an end view of the electrode of FIG. 4*a* looking inwardly thereof on arrow '4*c*';

FIG. 5*a* shows a side view of an alternate electrode to that of FIG. 1*a*;

FIG. 5*b* shows a view of a first end of the electrode of FIG. 5*a*;

FIG. 5*c* shows a view of the opposite end of the electrode of FIG. 5*a*;

FIG. 5*d* shows a section of the electrode of FIG. 5*a* taken on '5*d*-5*d*';

FIG. 5*e* shows a section of the electrode of FIG. 5*a* taken on '5*e*-5*e*';

FIG. 5*f* shows a side view of an alternate electrode to that of FIG. 5*a*;

FIG. 5*g* shows a first end view of the electrode of FIG. 5*f*;

FIG. 5*h* shows a side view of another alternate electrode to that of FIG. 5*a*; and FIG. 5*i* shows a first end view of the electrode of FIG. 5*h*.

DETAILED DESCRIPTION

The description that follows, and the embodiments described therein, are provided by way of illustration of an example, or examples, of particular embodiments of the principles of aspects of the present invention. These examples are provided for the purposes of explanation, and not of limitation, of those principles and of the invention. In the description, like parts are marked throughout the specification and the drawings with the same respective reference numerals. The drawings are not necessarily to scale and in some instances, proportions may have been exaggerated in order more clearly to depict certain features of the invention.

In this description, a welding electrode may be of either the male type or the female type, as described below. In either case, the welding electrode may have the general form of a body of revolution formed about a central axis. This body of revolution may be considered in terms of a polar cylindrical co-ordinate system having a long axis, or axial direction, which may be termed the z-axis, a radial direction or radial axis r extending away from the z-axis, and a circumferential direction mutually perpendicular to the axial and radial directions, referenced from an angular datum.

Consider the example of a male type of electrode shown in FIG. 1*a* and FIG. 1*b*. In this instance, an electrode 20 can be mounted to an electrode holder 22 (shown in phantom in FIG. 1*b*). Electrode holder 22 may be provided with a coolant supply conduit 24 (shown in phantom), such as may be an internal passageway for a coolant such as water. Electrode holder 22 may also have a coolant return passageway 26 (shown in phantom) such as may be used to extract coolant from within electrode 20.

In terms of morphology, welding electrode 20 has a body 30. Body 30 may have two principle regions, those being a head, indicated generally as 32, and a shank, indicated generally as 34. Shank 34 may have an external face 36, which, to the extent that shank 34 may have an external taper, indicated by taper angle α, may be a truncated conical section, in which the narrow end 38 extends away from head 32, and the wider end 40 terminates at a shoulder 42. The taper of shank 34 may be such as to facilitate the introduction of shank 34 into a socket of a welding electrode holder, such as holder 22, and may tend to wedge into the holder to yield a tight, binding fit in the electrode holder socket giving a contact interface such as may be suited to the transmission of electrical current.

Shoulder 42 may extend in a plane that is substantially perpendicular to the long or central axis, or axis of revolution, indicated as CL, such that shoulder 42 may have the form of an annulus. Shoulder 42 may have an axially rearwardly facing surface 44 that may be termed an abutment, or abutment surface, and that may, in use, abut the end of the electrode holder, and which may, in use, provide a current path for electrical flow.

Shank 34 may be hollow. For example, shank 34 may have a cavity, or chamber formed therein, which may be identified as a bore 46 extending axially inwardly from distal end 38. Bore 46 may be cylindrical, or, for example where formed by a punch, may have a small taper, such as may tend to facilitate removal of the part from a forming punch or die. Bore 46 may be a blind bore, and may extend axially beyond shoulder 42 to terminate at a location within the bulk of body 30 at a bore end region 48. Bore end region 48 may be somewhat contracted, and may include a converging region 49. Converging region 49 may be of a tapering section, and that section may not necessarily be of circular tapering section. For example, converging region 49 may have a lobate form, as viewed from one end as in FIG. 2. That lobate form may include an array of tapering lobes 50 arranged about the longitudinal centerline, such as lobes 51, 52, 53 and 54. End region 48 may also include a convection heat transfer apparatus such as finwork 56, such as may include one or more fins. In one embodiment, finwork 56 may include a centrally located fin 57. Fin 57 may have a truncated conical form extending from a generally broad base to a narrower tip 59. Fin 58 may have a tapering circular section. Fin 58 may tend to be relatively squat. The ratio of height to base width (in this instance, diameter) may be in the range of less than 2:1, may be less than 1:1, and, in one embodiment, may be less than 2:3. Bore end region 48 may terminate at an end wall 62 that extends about the wide end of fin 57 and meets with the surrounding tapered lobate convergent wall 47 of bore end region 48 more generally. Wall 55 may be the forewardmost extremity of bore 46. It is believed that the relatively close proximity of the end of the waterhole to the welding interface may tend to provide a short conduction path to a surface having a relatively high rate of heat transfer to the liquid cooling medium. It may then be that aggressive liquid cooling on the inside of the waterhole may discourage or delay annealing of the base copper alloy of the weld cap in the tip region, such as may tend to extend weld cap life.

Head portion 32 may have a tip region, 60, and a flank region 62 extending axially rearwardly therefrom. The surface of flank region 62 may also extend radially outwardly and rearwardly relative to tip region 60, and may extend rearwardly on an arcuate portion 64. In cross-section that arcuate portion may be formed on a portion of a parabolic or elliptic curve. Tip region 60 may be a truncation of that parabolic or elliptic form, and may be flat. Head portion 32 may initially be formed in a fully parabolic or elliptic form, and then tip region 60 may be dressed to yield the final contact profile. For example, head portion 32 may initially include end portion 61, which forms the extremity of the parabolic or elliptic section. During the process of dressing, end portion 61 may be removed in part, to give a truncated profile with a flat end, as at 60, or such other profile as may be suitable. Flank region 62 may include, or lead into, a barrel-like base region 66, that may be of substantially constant radius, and which may terminate at shoulder 42.

Bore 46, and region 48 of bore 46, may be referred to as a water hole. The overall characteristic width dimension of cap 20 may be taken as the outside diameter, $\phi$, measured over the body of cap 20 forward of shoulder 42. Another dimension, $\delta_1$ may be taken from the apogee of the parabolic or elliptic curve of the electrode, at 60, to the endmost forward extremity of the water hole, as at wall 55. A further dimension $\delta_2$ may be taken from the apogee of the parabolic or elliptic curve to the face of shoulder 42. A third dimension, $\delta_3$ may be taken from the dressed face, as at 60, to the nearest part of the waterhole, as at end wall 62. In one embodiment, a ratio may be taken between the characteristic sectional dimension and the first distance $\phi:\delta_1$. This ratio may be greater than 2:1, and in some instances may be greater than about 5:2. Another ratio may be taken between the first distance, $\delta_1$ and the second distance, $\delta_2$. In one embodiment, this ratio may be less than ⅔ and may lie in the range of about 0.3 to about 0.5. Alternatively, a third ratio may be taken between the difference between the first and second distances (where $\delta_4=\delta_2-\delta_1$). This ratio may lie in the range of 5:12 to 2:3. It is believed that the parabolic or elliptic shape may tend to discourage or delay plastic deformation of the end of the welding cap as compared to the styles recommended in ISO 5821 or by the Resistance Welding Manufacturers' Association (RWMA) which have "bullet" and radiused designs.

In one embodiment, end wall 55 does not intersect the longitudinal centerline, but rather forms a ring, or ring-like surface in the shape of interlinking lobate portions extending about the longitudinal centerline CL of cap 20.

Figure 3:
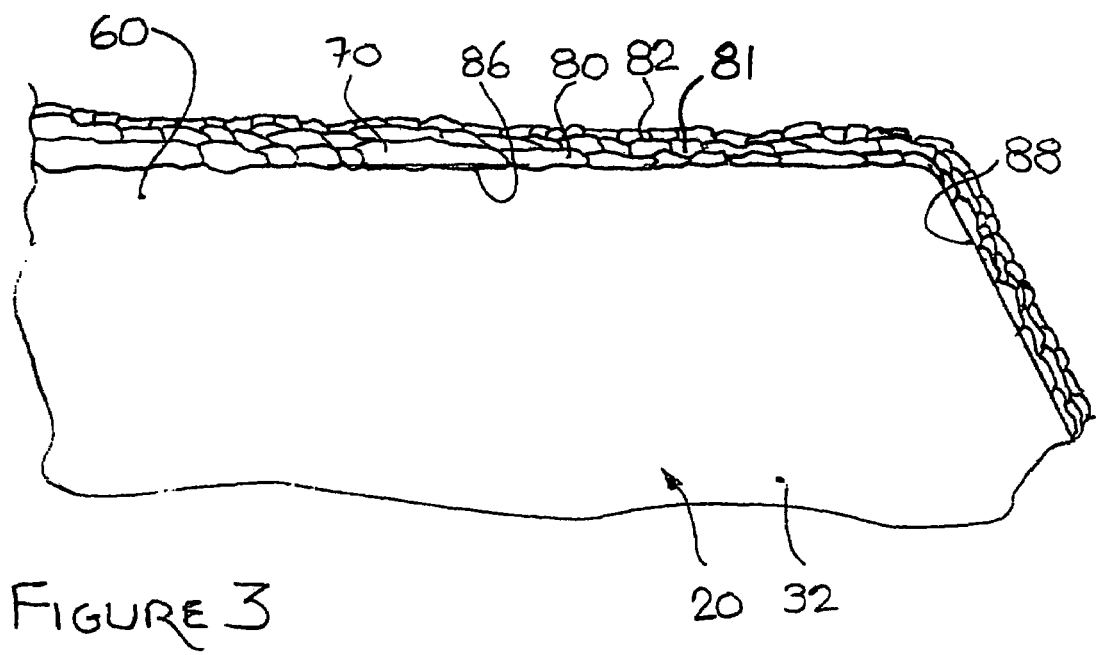
FIG. 3 shows a much enlarged detail of a contact end region of the electrode of FIG. 1 showing a surface coating thereof with cross-hatching omitted for clarity.

Referring to FIG. 3, tip region 60 may have a coating 70 formed thereon, as discussed below. It may be that body 30, may be made from a substantially pure copper, or a copper based alloy, having relatively high thermal conductivity (perhaps greater than 200 W/m K). Some alloys may be predominantly ternary alloys composed of Copper, Chromium and Zirconium (CuCrZr). Other alloys may be predominantly binary alloys, such as Copper and Zirconium (CuZr) or Copper and Chromium (CuCr). Copper Tungsten (CuW) and Copper Alumina (Cu—$Al_2O_3$) alloys may also possible alternate coating materials. One copper alloy with silver is suggested in U.S. Pat. No. 4,734,254 of Nippert, issued Mar. 29, 1988. Another alloy may be a dispersion strengthened alloy, as discussed in U.S. Pat. No. 4,423,617 of Nippert, issued Jan. 3, 1984. The dispersion strengthened alloy may be included in a portion of electrode 20 such as, for example only that portion forming the tip thereof.

Electrode 20 (or 120, or 170, described below) may be manufactured in a number of ways, whether by machining from solid, casting, or by forging. In terms of the formation of a solid slug of copper, (or of a copper alloy, as may be) it may, for example, be manufactured in a manner generally similar to that described in U.S. Pat. No. 4,423,617 of Nippert, issued Jan. 3, 1984. However, the core of the shank may be formed with a male die or progression of dies having an external profile corresponding to the profile described above, and having cavities tending to define the heat transfer ribs or fins.

The manufacture of electrode 20 (or of electrodes 120 or 170, below) may include the step of providing a coating 70 to the contact region at tip 60 of the electrode. The coating 70 may include a first surface coating layer, or substrate, or composition, however it may be termed, and which is indicated generally be the number 80, that may be overlain in whole or in part by a second surface coating layer, superstrate, or composition 81.

The step of providing an end coating 70 to the tip region 60 of electrode 20 may be preceded by the step of removing impurities from that end region 60. The end region 60 may include a flattened or trimmed end face such as face 60, and may include some or all of an adjacent portion 88 of the tapered flank region 62. The step of removing impurities may include the step of removing oxides, or dirt, or oils, or all of them. Alternatively or additionally, there may be a step of work hardening the end region. The step of removing impurities and the step of work hardening may occur at the same time, in the same process and may include importing a compressive residual stress to contact region 60. The step of work hardening may include the step of shot-peening end region 60. The step of shot-peening may tend to remove surface impurities and leave a relatively fresh, clean surface upon which to apply a surface coating. The shot used for shot peening may be made of a non-participating material (i.e., a material that is substantially non-reactive with copper), such as glass beads. In one embodiment, for example, a gas such as compressed air in the range of 30-50 psig may be used to direct No. 7 glass beads at the uncoated ends of electrodes for a time period that may be in the range of 15 seconds to a minute. In one embodiment this time period may be about half a minute.

The first portion, or region, or layer 80, may be formed with a composition that differs from the overlying layer 81, which may in turn differ from the composition of layer 82 (if there is any such third layer), which may differ from the composition of any further layers. It may be that while the composition of the powder or solid stick of material from which the coating is made may be known before the coating process commences, the very process of creation or deposition of the layers may cause local melting and alloying to occur. As such, the layers may have a tendency to blur or bleed or flow into one another such that the composition of the various layers may not vary sharply or distinctly, and yet there may be a concentration gradient of one constituent or another.

The first layer or region or base coating may be relatively richer in certain materials than other layers. For example, the first layer may include a relatively higher concentration of Nickel, or Nickel alloys, than perhaps may be included in one or more subsequent layers. Alternatively, or additionally, a layer nearest or relatively near to the copper (or predominantly copper) body of the weld cap may include a relatively higher concentration of Molybdenum, or Tungsten, or both, than the next subsequent layer, or layers. It is thought that alloys with relatively higher quantities of relatively softer metals, such as Nickel and Molybdenum-Tungsten alloys, may tend to have an affinity for Copper, and may tend to discourage porosity, cavities, and surface cracking in the overlying, relatively hard, predominantly titanium or titanium carbide layer, or coating, perhaps more readily than those harder alloys (such as may be applied in one or more subsequent layers) might otherwise do without the intermediary effect of the base coating layer of a different composition. It is also thought that the softer metal or metal alloy layers may tolerate thermal expansion, or act as a moderating or buffering influence in terms of thermal expansion, between the underlying predominantly copper (or copper alloy) and the overlying titanium, titanium carbide, or titanium diboride predominating layer (or layers). It is also thought that these intermediate, softer layers may aid in overall adhesion of the predominantly titanium, titanium carbide or titanium diboride alloy coating relative to the underlying predominantly copper matrix of the weld cap. That is, the underlay may in effect tend to function as an intermediate bonding layer between the underlying copper based matrix and the harder overlying Titanium based layer, or layers, as may be. In one embodiment, the powder or sintered rod material deposited to create the initial layer, or layers, may have a Nickel content in the range of 8-40 wt % Nickel, or more narrowly between 10 wt % and 35 wt % Nickel. Alternatively, it may contain 25-35 wt % Nickel. Another layer may contain 10-20 wt % Nickel.

Alternatively, or additionally, prior to deposition, the powder or sintered rod material may include 3 to 20 wt % Molybdenum. In another embodiment it may include 10-15 wt % Molybdenum, and in another it may include 4-8 wt % Molybdenum. Alternatively, or additionally, it may include between about 0.65 and 2.0 wt % Tungsten. In another layer there may be about 0.8 to 1.1% Tungsten. In another layer there may be about 1.2 to 1.8% Tungsten. The sum of the Molybdenum Tungsten may be in the range of about 5 wt % to about 17 wt %. In one embodiment the sum of the Molybdenum and Tungsten in the powder or sintered rod material before deposition may be about 5 to 8 wt %. In another layer the sum of the Molybdenum and Tungsten is about 12 to 17 wt %.

A subsequent layer, or layers, of coating may be relatively richer in Titanium, or a Titanium alloy, such as Titanium carbide, and, where several such layers are deposited, may be increasingly rich in Titanium or Titanium alloy in succeeding layers. Examples of Titanium alloys are Titanium carbide (TiC) and Titanium diboride ($TiB_2$). Such a layer, or layers, may tend to be harder than the previously deposited Nickel, Molybdenum or Tungsten rich layer, or layers. The Titanium or Titanium Carbide or Titanium diboride layers may be made from a powder or stick having an initial concentration, by weight, of between 60 and 80 wt % Titanium. Such a powder may also contain 10-35 wt % Nickel, or, in one embodiment 13-17 wt % Ni, in another embodiment 28-35 wt % Nickel.

A finishing, or covering layer, or layers, may once again include a relatively higher Nickel, Molybdenum or Tungsten, or Molybdenum and Tungsten content as compared to the predominantly Titanium, Titanium carbide or Titanium diboride material layer. This overlay may tend to fill cracks or discontinuities in the underlying Titanium carbide or Titanium diboride layers. It is believed that such relatively Molybdenum or Tungsten rich layers may tend to discourage Zinc migration into those cracks and discontinuities. That is to say, where there is a Titanium based stratum, or quasi-stratum of material deposited as a covering, such as a Titanium carbide or Titanium diboride covering, that may be relatively hard and may have cracks, or voids, or other imperfections, in some embodiments an overlay may be provided, to fill or coat those imperfections and hence to discourage migration of molten Zinc therethrough. That overlay may include material having greater toughness than the Titanium based layer, and having a higher melting point than Zinc. In one embodiment, that material might be, or include, Molybdenum. In another, it might be, or include, Nickel. That overlay may also include Tungsten component.

In one embodiment, a predominantly Titanium carbide layer may be applied to the copper substrate, and a relatively Molybdenum and Tungsten rich layer may be applied as an overlay on the Titanium carbide. When applied, the materials become molten, and, in a re-melted condition the materials tend to become mixed. Upon the surface of the finished electrode, after deposition, the resultant coating region may be approximately 40 to 50 wt % titanium, 10 to 30 wt % Nickel, and 20 to 40 wt % Copper. The initial powder or sintered rod used to produce this coating may be 70 to 80 wt % Titanium carbide, 10 to 15 wt % Nickel, and 10 to 15 wt % Molybdenum. In some instances, powders may be used for laser cladding, whereas sintered rods may be used for electric spark deposition.

As noted, the various layers may be applied by spark deposition or laser cladding. Where spark deposition is employed, the electrical current may be at 60 Hz a.c. Alternatively, it may be by way of variable dc, such as by pulsed DC or half rectified AC. It may be that in some embodiments in which electric current is used, the electric current may be varied at a frequency greater than 100 Hz. In some instances the frequency may be greater than 1000 Hz, and in some instances the frequency may be in the range of 5000 Hz to 50,000 Hz. In one embodiment the frequency employed may be 10,000 or 20,000 Hz, (+/−25%).

In one application, the overall monolithic coating layer at the surface (by wt. %) was approximately 50% Titanium, 20% Nickel and 25% Copper, a two layer coating was approximately 40% Titanium, 40% Nickel and 15% Copper, and in a three layer coating Titanium was approximately 15%, Nickel 70% and Copper 15%. (The percentages may vary by 10% or more, depending upon where and how the measurements are taken. For instance, in the centre of the overlays, the Titanium percentage may tend to be greater.)

Whereas welding electrode 20 of FIGS. 1a and 1b may be termed a male electrode, FIGS. 4a, 4b and 4c show a female electrode 120. Female electrode 120 has a body 130 having a head portion 132 and a shank portion 134. In this instance shank portion 134 may have an external substantially round cylindrical skirt 136, and a predominantly radially inwardly facing tapered face 138 such as may fit onto an electrode holder having a mating socket or mandrel. The taper of this face may be at a small angle, such as angle α. An internal bore 146 may be formed within shank portion 134, and may extend axially from the distal end 142 of shank portion 134 to end at a blind forwardmost extremity 144. The taper may end at a first longitudinal location or shoulder 148 that is some portion of the distance from end 142 to apex 144. The male electrode seat is identified as holder 122, (shown in phantom). The foremost end of holder 122 may abut shoulder 148. The foremost portion 149 of internal bore 146 may have substantially the same internal geometry as that described above in the context of cap 20, with the similar parts being given the same item numbers as employed above.

Head portion 132 may have a flat tip or tip region 160, and may then be trimmed or dressed to yield a flat tip as shown in the example of FIGS. 1a and 1b, that may be trimmed or dressed from an initially rounded tip 152. That rounded tip 152 may be formed initially on a parabolic or elliptic curve as above. Head portion 132 may have arcuate flanks 153, as shown in the example of FIG. 1a, and may terminate substantially tangentially into a radially outwardly facing circular cylindrical wall 154. It may be that the axially innermost extremity of bore 146, being end wall 155, is spaced axially from should 148 a distance $\delta_5$, that distance being the depth of water hole 150 from the slope discontinuity in the inner wall of bore 146 to the end. The axial distance between wall 155 and tip 160 is again indicated as $\delta_3$. As note above, $\delta_3$ may be relatively small. That is $\delta_3$, may be less than ⅔ of the overall diameter, $\varnothing_1$ of cap 120. In one embodiment $\delta_3$ may be ½ of $\varnothing_1$ or less, and, in another embodiment may be in the range of ⅜ to ½ $\varnothing_1$, and, may be about ⅖ $\varnothing_1$.

Alternatively expressed, the waterhole portion of bore 146 lying forward of shoulder 148 is large relative to the overall distance from shoulder 148 to tip 160 (or 152). That is, the ratio of distance $\delta_5$ to distance $\delta_3$ may lie in the range of 2:3 to 1:1, may lie in the narrower range of 3:4 to 9:10, and may, in one embodiment be about 4:5. It may also be that the major transverse dimension of the waterhole at the end lying forward of the finwork 56, symbolized by dimension $\varnothing_3$ of end wall 155, may be greater than the major dimension of tip region 160, indicated as tip diameter $\varnothing_2$. A portion or all of tip 160 may be provided with coating 70 as described above in the context of electrode 20. Electrode 120 may be made of any of the materials noted in the context of electrode 20, and may be manufactured according to the steps described in the context of electrode 20.

A further alternate electrode is shown in FIG. 6a as 170. Electrode 170 may be generally similar to electrode 120, and may have an external coating of any of the types discussed herein. Electrode 170 may tend to differ from electrode 120 insofar as the internal contours may tend to be rounded. Further, electrode 170 may, alternatively, be produced in a non-coated form and shipped to customers in an untrimmed condition, for trimming to an initial weld contact diameter, which may vary from an untrimmed tip to a tip of moderate flat diameter, to a tip of greater flat diameter. It may be appreciated that electrode 170 may be produced in a female format, akin to electrode 120, or in a male format, akin to electrode 20, by providing an appropriate shank.

Electrode 170 may have a body 172 having a head portion 174 and a shank portion 176. Shank portion 176 may be substantially the same as shank portion 134. Electrode 170 may have an internal bore 178 formed within shank portion 176. Bore 178 may extend axially from the distal end 142 of shank portion 176 to end at a blind forwardmost apex or extremity 180. The taper may end at a first longitudinal location or shoulder or wall discontinuity 182 that is some portion of the distance from end 142 to extremity 180. The foremost portion 184 of internal bore 178 may have different internal geometry from that described above in the context of cap 20. Rather than having a substantially planar peripheral shoulder, such as shoulder 148, the transition at the slope discontinuity 182 may have the form of a rounded, or radiused, transition 186. This transition leads to the tapered wall 188 of one or another of the array of lobate bores, or chambers, or sub-cavities identified as lobes 189, 190, 191, 192, each of which may terminate at a rounded dome end 194, which may be formed on an arch or vault-like curvature that is substantially spherical. These lobes may tend to provide a plurality of cooling chambers. The interstitial flats at 196 may tend to provide an axial stop for the inserted male electrode holder. In the region between lobes 189, 190, 191, and 192 there may be a protruding cooling array, such as may be identified as finwork 200. In one embodiment, the central, axially rearwardly protruding end of finwork 200 may tend to have a somewhat rounded cruciform cross-section, somewhat like the tip of a Phillips screwdriver, with rounded edges. This cruciform shape may tend to merge, or extend into a set of outwardly extending vanes or fins identified in the illustrations as radially extending, axially upstanding webs 198 that intersect at, and extend from, a central portion identified as finpost 201. Finpost 201 may not be of round section, but may have a greater major cross-wise dimension in one direction, and a lesser major cross-wise dimension in another that is offset by half the pitch angle between lobes. At their radially outermost portions, webs 198 merge into the outer peripheral portion running toward the centers of flats 196. Radiating webs 198 may tend to vary in thickness both in the radial direction and in the axial direction, tending to be thicker at their axial base (i.e., axially closest to foremost portion 184), and thinnest at the plane defined by the plane running through the line of centers of the adjacent lobes, that plane being indicated as 195. That is to say, a radially extending web portion is interposed between the centers of each pair of adjacent lobes, and may tend to conduct heat away from tip 202; may tend to act as a partition between adjacent lobes, thus tending to segregate the lobes from each other; and may provide a heat transfer surface of increased surface area, across which surface, or surfaces, coolant may be compelled to flow. The edges of the surfaces over which the coolant may flow, or which may be engaged by coolant flow, may be rounded, rather than sharp, as indicated. In operation, coolant introduced axially, and directed in the forward direction may tend to be split by the cruciform section of finwork 200 (i.e., it may function as a flow splitter), and flows along the walls defined by the lobate surfaces. These walls being smoothly rounded, may tend to act as vanes redirecting the flow rearwardly, with corresponding heat transfer to the fluid. The fluid leaving this region is exhausted rearwardly. The arc of the smooth surface may extend over a curvature of greater than 120 degrees of arc, and may, in one embodiment, extend over a curvature of substantially 180 degrees of arc.

It may also be noted that the height of finpost 201, indicated as $\delta_8$ may tend to be a greater proportion of the height between the apex and wall discontinuity, indicated as $\delta_9$ than $\delta_3$ is of $\delta_5$, for example. In one embodiment the ration of $\delta_8$ to $\delta_9$ may lie in the range of ⅔ to 9/10. Similarly, the minimum height of each web 198, being the height obtained by subtracting indicated dimension $\delta_{10}$ from $\delta_9$, may be taken as a proportion. In one embodiment, that proportion may lie in the range of ½ to ⅘ of $\delta_8$. That is to say, finpost 201 may stand axially proud of the adjacent minima of webs 198. The array of webs and lobes illustrated is intended to be representative of any multi-lobed or multi-webbed arrangement, be it of two, three, four, five, six, seven, eight or more lobes or webs, as may be. It may also be that the distance from the welding tip face or region 202 may be closer, measured in the axial direction, to extremity 180 than formerly customary, and may be in the range of ⅖ to ⅗ of the distance from the shoulder discontinuity to the apex of the parabolic form, or to the actual trimmed tip face flat, as may be.

Head portion 174 may have a tip or tip region 202, that may be left untrimmed, as shown as 204 in FIGS. 5h and 5i, or trimmed in an intermediate manner, as shown at 206 in FIGS. 5f and 5g that may be trimmed or dressed from an initially the rounded tip 202. This may permit the use of a welding face having a diameter corresponding to the size of a weld nugget sought for the metal thickness being welded, in combination with a parabolic (or other curve) adjacent curved surface.

Where the tip is to be employed in the original round end configuration (or FIG. 5h, for example), or where trimming to size (as in FIG. 5a or 5f) occurs before shipment to an end user, a portion or all of tip region 202 may be provided with coating 70 as described above in the context of electrode 20. Electrode 120 may be made of any of the materials noted in the context of electrode 20, and may be manufactured according to the steps described in the context of electrode 20.

Where a coated tip is employed, it may be that a welding cap formed as indicated herein, may be employed in a welding process including the step of using such welding cap in a welding tool clenched to two objects, such as sheets of metal, to be welded together, wherein those objects may include zinc or nickel, or zinc and nickel coated steels, advanced high strength steels, and aluminized, or aluminium sheets. The process may include use of the electrode without the step of conditioning the electrode prior to use with those materials, or one of them. In such use, it may be that there may be a reduction in the tendency to stick to the surface of the material to be welded, and there may be a corresponding reduced tendency to deposit copper on the work pieces. Over time, to the extent that degradation of the electrode may occur, the use of the electrode may include the step of current stepping.

Alternatively, to the extent that the coating on the electrode may tend to be non-reactive with the work piece, there may be reduced pick up from the surface of the work piece, such as from zinc based or zinc coated work pieces, which may tend to reduce or delay chemical alloying of the electrode and impurities picked up from the work piece, and so may tend to reduce or delay degradation of the electrode.

The presence of internal finwork for interaction with coolant flows may tend to aid in cooling of the electrode, and may slow, or discourage, annealing of the electrode over time. It may be that such cooling may permit more concentrated heating of the weld nugget, as opposed to heating of the adjacent electrode.

Various embodiments have been described in detail. Since changes in and or additions to the above-described best mode may be made without departing from the nature, spirit or scope of the invention, the invention is not to be limited to those details.

I claim:

1. A welding electrode, said welding electrode having a body formed of a predominantly copper based material; said electrode having a first end for engagement with an electrode holder, and a second end having a welding tip for engagement with an object to be welded; said welding tip having a coating formed thereon; said coating including a first layer and a second layer; at least one of said layers being a titanium based layer, said first layer is immediately adjacent to said predominantly copper based material of said welding electrode body, said second layer is more distant from said body, and said second layer has a higher weight percentage of titanium than does said first layer.

2. The welding electrode of claim 1, said welding electrode having a hollow body, said first end being open to the admission and exhaust of cooling fluid to and from said hollow body; said hollow body having an array of chambers formed therein, said chambers extending away from said entrance toward said welding tip; and said electrode having webs formed therewithin between adjacent pairs of said chambers.

3. The welding electrode of claim 2 wherein said electrode includes smooth arcuate surfaces formed to re-direct cooling fluid from a predominantly axially forwardly flow direction to a predominantly axially rearwardly flow direction.

4. The welding electrode of claim 3 wherein said first layer is immediately adjacent to said predominantly copper based body, said second layer is more distant from said body, and said second layer has a lower weight percentage of titanium than does said first layer.

5. The welding electrode of claim 3 wherein said arcuate surfaces subtend a smooth change of curvature in the direction of flow of at least 120 degrees of arc.

6. The welding electrode of claim 2 wherein said chambers include smooth surfaces for engaging cooling fluid, and said smooth surfaces extend through an arc for re-directing cooling fluid, said arc being greater than 120 degrees.

7. The welding electrode of claim 1 wherein said electrode has an overlay deposited thereon, said overlay including a material having greater toughness than titanium carbide, and a higher melting temperature than zinc.

8. The welding electrode of claim 1 wherein at least a portion of said electrode is formed of a dispersion hardened copper alloy.

9. The welding electrode of claim 1 wherein said first layer is an underlay layer formed by depositing a material that is at least 5 wt % molybdenum on said predominantly copper based material of the welding cap body.

10. The welding electrode of claim 1 wherein said first layer is an underlay layer formed by depositing a material that is at least 5 wt % tungsten on said predominantly copper body.

11. The welding electrode of claim 1 wherein one of said layers includes a mixture of molybdenum and tungsten, and that mixture of molybdenum and tungsten is part of a coating material applied to said body, the molybdenum and tungsten together forming 10 to 15 wt % of said material.

12. A welding electrode, said welding electrode having a body formed of a predominantly copper based material; said electrode having a first end for engagement with an electrode holder, and a second end having a welding tip for engagement with an object to be welded; said welding tip having a coating formed thereon; said coating including a first layer, a second layer, and a third layer; at least one of said layers being a titanium based layer, the first layer having a different weight percentage of titanium than said second layer.

13. The welding electrode of claim 12 wherein said titanium based layer includes titanium in the form of titanium carbide.

14. The welding electrode of claim 12 wherein said first layer is a titanium based layer, and said second layer is an overlay deposited on said titanium based layer.

15. The welding electrode of claim 14 wherein said titanium based layer has a predominant component that is one of (a) titanium carbide; and (b) titanium diboride.

16. The welding electrode of claim 14 wherein said overlay includes at least one of (a) molybdenum; and (b) nickel.

17. The welding electrode of claim 14 wherein said overlay is predominantly nickel.

18. The welding electrode of claim 12 wherein said third layer is an overlay that includes at least one of (a) molybdenum; and (b) nickel.

19. The welding electrode of claim 12 wherein said third layer is an overlay, and said overlay is predominantly nickel.

20. The welding electrode of claim 12 wherein said first layer is an underlay, and said third layer is an overlay.

21. The welding electrode of claim 20 wherein said underlay includes at least one of nickel, molybdenum and tungsten.

22. The welding electrode of claim 21 wherein said underlay includes at least one of the following:
   (a) nickel in the range of 8-40 wt % of the deposited material of the underlay layer;
   (b) molybdenum in the range of 3-20 wt % of the deposited material of the underlay layer; and
   (c) tungsten in the range of 0.65 to 2.0 wt % of the deposited underlay material.

23. The welding electrode of claim 20 wherein said overlay includes at least one of (a) molybdenum and (b) nickel.

24. The welding electrode of claim 20 wherein:
   the largest constituent of said second layer is one of (a) titanium carbide; and (b) titanium diboride; said first layer is an underlay including at least one of (c) tungsten and (d) molybdenum;
   said third layer includes at least one of (e) molybdenum and (f) nickel; and
   said second layer is richer in titanium than is said first layer.

* * * * *